Patented May 22, 1928.

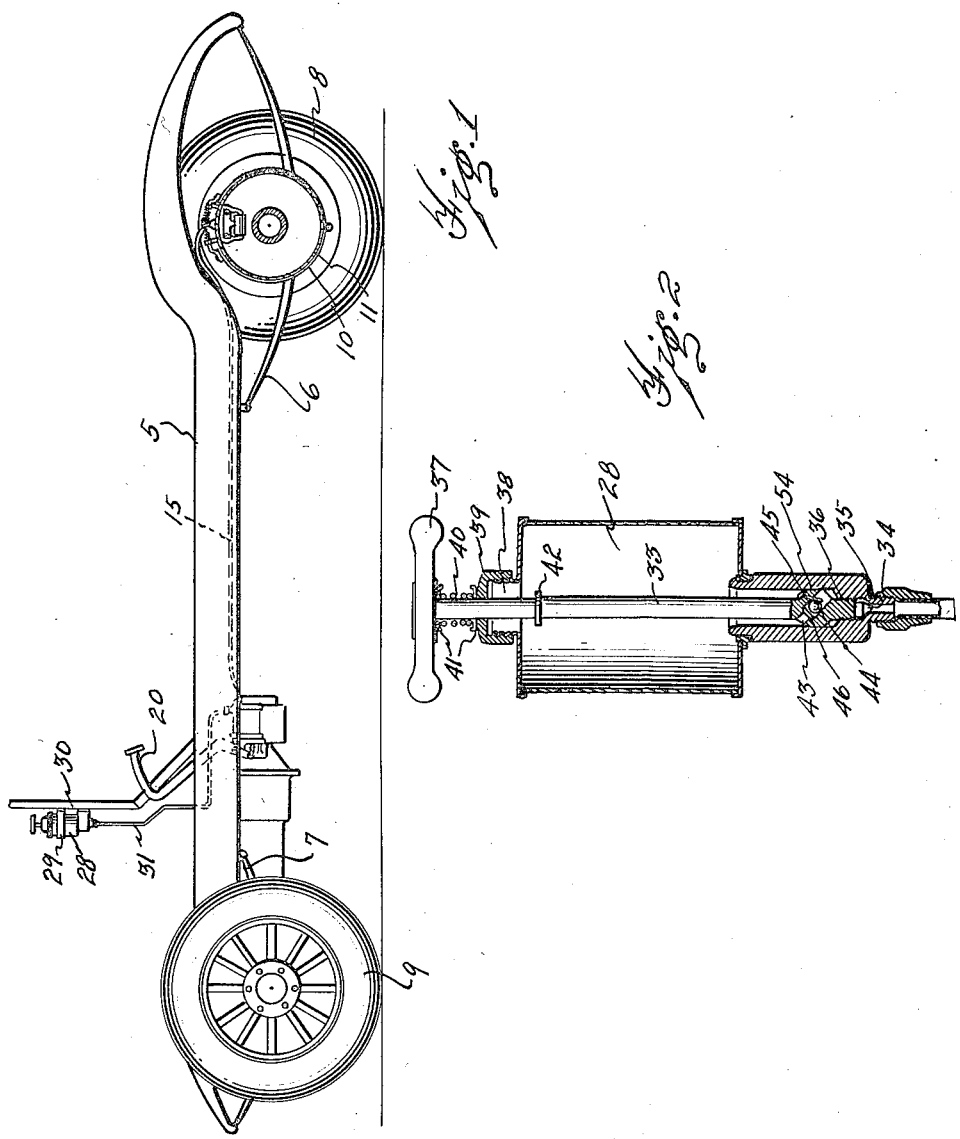

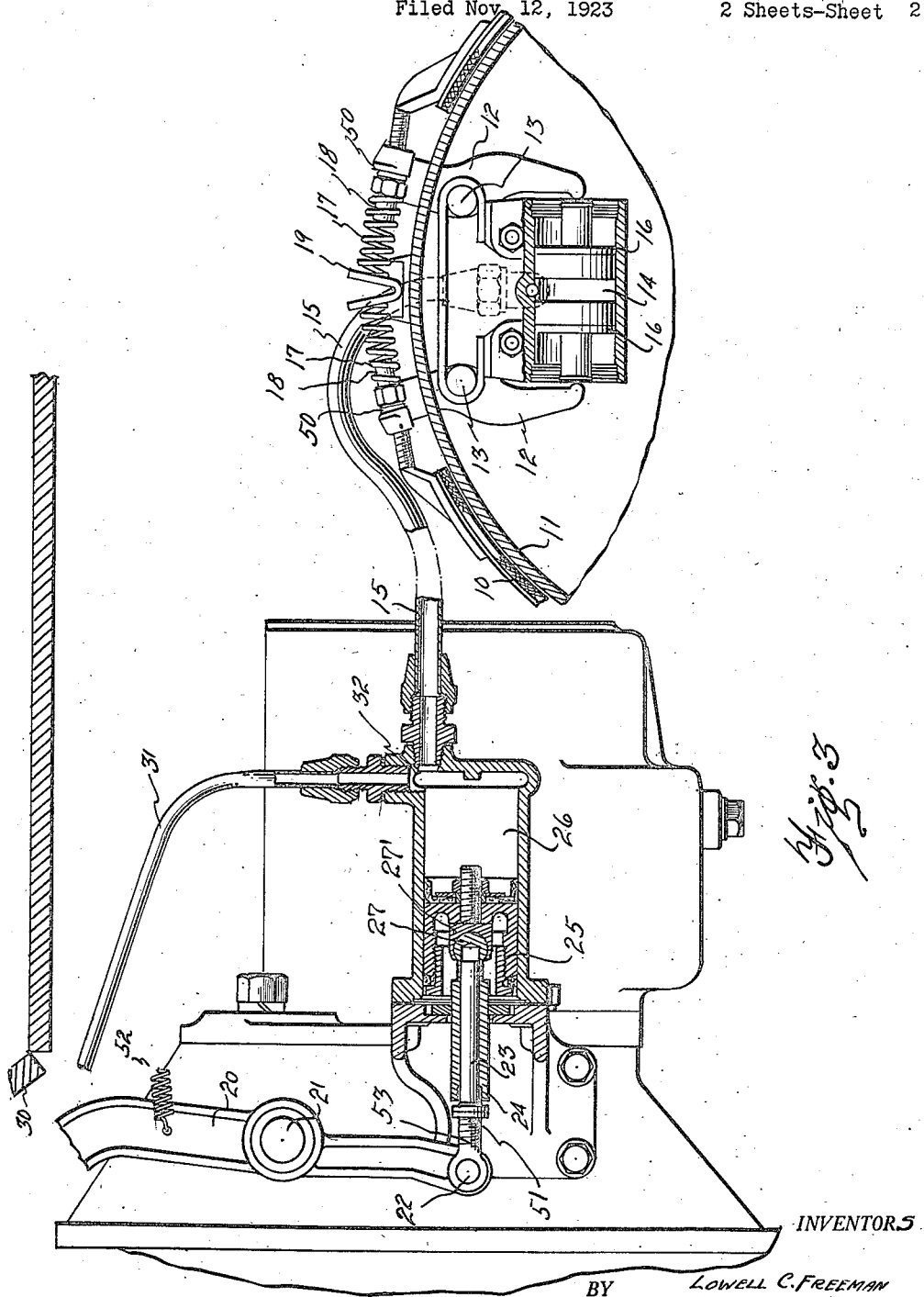

1,670,533

UNITED STATES PATENT OFFICE.

LOWELL C. FREEMAN, HOWARD E. MAYNARD, AND CARL BREER, OF DETROIT, MICHIGAN, ASSIGNORS TO CHRYSLER CORPORATION, OF HIGHLAND PARK, MICHIGAN, A CORPORATION OF DELAWARE.

BRAKING SYSTEM.

Application filed November 12, 1923. Serial No. 674,173.

In the construction of hydraulic brakes it is of the utmost importance that the construction be such as to prevent as nearly as possible the entrance of air into the system so as to maintain the liquid in the system at not lower than atmospheric pressure. It is of equal importance to maintain as nearly as possible a constant supply of fluid in the system, and accordingly to provide a simple manner of introducing fluid into the system.

It is therefore the primary object of our invention to prevent as nearly as possible the entrance of air into the braking system and more particularly to relieve the possibility of air forcing into the system through the creation of less than atmospheric pressure therein when the foot pedal, after its being depressed, is rapidly returned to its normal position. This action in all of the devices of the prior art is likely to induce a vacuum in the system with the result that air is drawn therein.

It is a further primary object of our invention to provide a simple and efficient mechanism for supplying fluid into the system so as to make possible the maintenance of a substantially constant supply of fluid therein, and to do this without filling the system with air.

With these and other objects in view our invention consists in the arrangement, combination and construction of the various parts of our improved device as described in the specification, claimed in our claims and shown in the accompanying drawings in which:

Fig. 1 is a side elevation of an automobile chassis showing a portion of our device assembled thereon.

Fig. 2 is a central sectional view of the mechanism utilized for supplying fluid to the braking system.

Fig. 3 is a central sectional view with certain parts broken away showing the braking apparatus and the means for forcing fluid therein.

We have shown an automobile chassis consisting of a frame 5 suspended by springs 6 and 7 between the wheels 8 and 9 respectively.

Our improved device is applicable to four wheel braking systems, but we have herein shown it applied to only one end of the chassis frame wherein the brake band 10 encircles the brake drum 11. The brake band is connected at its two ends at 50 to rockers 12 which are pivoted at 13 and adapted to be actuated by fluid entering the chamber 14 through a conduit 15 and forcing outwardly pistons 16. When the pressure behind the fluid in conduit 15 is released the brake band 10 will be forced to expand by the coiled springs 17, which are disposed over the extreme outer ends 18 of the brake band and abut member 19 at their other ends, so that pressure upon the brake drum 11, which causes a braking action, will cease.

The passage of fluid through the conduit 15 under pressure is effected through the foot pedal 20 of the automobile which is pivoted at 21 and joined at 22 to a rod 23 loosely extended into the bushing or casing 24 attached to a large piston 25 adapted to operate in the cylinder 26. The bushing is provided with a ball end 27 received in a socket 27' of the piston 25 to provide universal movement of the bushing 24 and rod 23 due to the circumferential movement of the pedal 20. A pre-determined amount of fluid is maintained in the conduit 15 and the cylinder 26 so that upon movement of the foot pedal 20 with the consequent inward movement of the piston 25 the said fluid will be forced through the conduit 15 under pressure into the cylinder 14. A nut 51 is provided on the screw threaded portion 53 of the rod 23 adapted to contact with the end of the bushing 24, so as to make possible the adjustment of the movement required by the foot pedal in order to cause movement of the piston 25.

When it is desired to relieve the pressure upon the fluid, and correspondingly the braking pressure, the pressure upon the foot pedal may be released and the fluid will be forced backward through the conduit 15 by the action of the springs 17. The foot pedal 20 may have the ordinary return spring 52 to force it back to its normal position. By reason of the loose connection between the rod 23 and the casing or bushing 24, the fast or slow return of the pedal 20 will not in any way effect the return of the piston 25, thus making it impossible to quickly return the piston 25 with the result that air would be drawn into the system.

In our improved device, the piston 25 can be forced backwardly only by the backward pressure of the fluid, caused by the spreading of the springs 17 or otherwise.

In order to supply additional fluid to the system as it may be needed without letting air into the system, we have shown a supply receptacle 28 attached by a band 29 to the dash 30 of the automobile, which receptacle is connected by means of a conduit 31 to the braking system at the joinder of the cylinder 26 and the conduit 15 as is shown at 32.

We dispose a rod 33 through the receptacle 28 having a tapered end 34 on the lower portion thereof adapted to seat in the taper shown in the opening of the end 35, screwed in the conduit 31, in the commonly known fashion of a needle valve. The rod 33 is screw threaded adjacent its lower end at 36 so that by screwing downwardly through the handle 37, the tapered end 34 of the rod 33 may be forced to seat in the tapered portion of the opening in the end 35, which is screwed in the conduit 31, and thus isolate the braking system from the receptacle 28.

The receptacle 28 is provided with an opening 38 at the top thereof upon which a cap 39 is adapted to be screwed. A coiled spring 40 is disposed around the rod 33 between the handle 37 and the cap 39 and held in position by flanged washers 41.

When it is desired to place the receptacle 28 in communication with the braking system so as to force fluid therein, the handle 33 is rotated so as to unscrew the rod 33 at its screw threaded portion 36 when the rod 33 will be forced upwardly by the action of the spring 40 until stopped by the washer 42. Then by moving the rod 33 upwardly and downwardly the fluid in the receptacle 28 will be forced thru the conduit 31 in the braking system. The fluid will pass from the receptacle 28 thru the opening 43 provided adjacent the lower end of the rod 33 on the upward stroke of the said rod, and on the downward stroke thereof, the ball 44 which is held against the total downward displacement by the pin 45, will seat at 46 so as to prevent the return of the liquid into the receptacle 28 and force the passage thereof thru the conduit 31 into the braking system. The enlarged shank 54 on the rod 33 bears against the sides of the upper portion of the receptacle to prevent escape of fluid around the edges. Additional fluid may be added to the receptacle 28 from time to time as desired by removing the cap 39.

It will thus be seen that a simple and efficient construction is provided for adding fluid from time to time to the braking system without permitting the entrance of air therein so that the operator may, as his foot pedal shows the necessity therefor, periodically pump additional supplies of fluid into his braking system. It will also be seen that it is impossible for the quick return of the foot pedal to create a vacuum in the cylinder 26 so as to draw air into the system.

It will further be seen that the valve on the plunger, which acts as a pump, is self contained and therefore quite inexpensive of manufacture, because of the ease with which it is assembled. It should be further noted that the tank 28 is positioned above the master cylinder and has the plunger installed in the center thereof, with the pump opening above the liquid in the system. This arrangement obviates the necessity for a packing gland to prevent leakage. Primer pumps or the like require packing glands, which tend to leak when they become loose.

We desire it to be understood that various changes may be made in the arrangement, combination and construction of the various parts of our improved device without departing from the spirit of our invention and it is our intention to cover by our claims such changes as may be reasonably included within the scope thereof.

What we claim is:

1. A fluid braking system including a cylinder and a piston therein, a bushing connected to said piston, said connection comprising ball and socket members adapted to permit universal movement, a rod fitting said bushing and slidable therein; means on said rod for adjusting the movement of said rod, said piston being movable in one direction by said rod and adapted on movement to move the fluid in said system, braking members adapted to be operated on the movement of said fluid, means for forcing the return of said fluid when pressure on said rod is released, and means comprising a slidable connection between said rod and bushing permitting return movement of said rod independent of said piston.

2. A fluid braking system including a cylinder and a piston therein, a lever connected with said piston and adapted on movement to move the fluid in said system, said connection comprising a rod slidable in a bushing universally connected to said piston, braking members adapted to be operated on the movement of said fluid, and means for forcing the return of said fluid when pressure on said lever is released.

3. A fluid braking system including a cylinder and a piston therein, a lever loosely connected and pivoted to said piston so that movement thereof in one direction will move said piston and the fluid in said system, but movement in the opposite direction is permitted independent of said piston.

4. A fluid braking system including a cylinder and a piston therein, a lever loosely connected with said piston so that movement thereof in one direction will move said piston and the fluid in said system, but movement in the opposite direction is permitted independent of said piston, means for adjusting the movement required of said lever in order to move said piston, and means for returning said lever.

5. A device for supplying fluid to a fluid braking system comprising a tank, a plunger in said tank and extending through the top thereof, a handle on the end of said plunger, a spring disposed around said plunger and confined between said handle and the top of said tank, and means on the other end of said plunger adapted to force fluid from the bottom of said tank when said plunger is vertically reciprocated, said means including a hole through said plunger adapted to permit the passage of fluid downwardly therethrough when said plunger is elevated and a ball adapted to close said hole and prevent the return of the fluid upwardly when said plunger is depressed.

LOWELL C. FREEMAN.
HOWARD E. MAYNARD.
CARL BREER.